US009065551B2

(12) United States Patent
Aunkofer et al.

(10) Patent No.: US 9,065,551 B2
(45) Date of Patent: Jun. 23, 2015

(54) DEVICE AND METHOD FOR ADAPTIVELY SUPPRESSING IN-BAND INTERFERENCE SIGNALS IN RADIO RECEIVERS

(75) Inventors: Markus Aunkofer, Abensberg (DE); Martin Opitz, Regensburg (DE); Thomas Reisinger, Regenstauf (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 0 days.

(21) Appl. No.: 14/118,454

(22) PCT Filed: May 15, 2012

(86) PCT No.: PCT/EP2012/059034
§ 371 (c)(1),
(2), (4) Date: Mar. 6, 2014

(87) PCT Pub. No.: WO2012/156409
PCT Pub. Date: Nov. 22, 2012

(65) Prior Publication Data
US 2014/0169411 A1    Jun. 19, 2014

(30) Foreign Application Priority Data

May 16, 2011 (DE) .......... 10 2011 075 893

(51) Int. Cl.
*H04B 1/10* (2006.01)
*H04B 1/71* (2011.01)
*H04B 1/28* (2006.01)
(52) U.S. Cl.
CPC ............ *H04B 1/7101* (2013.01); *H04B 1/1036* (2013.01); *H04B 1/109* (2013.01); *H04B 1/28* (2013.01); *H04B 2001/1072* (2013.01)
(58) Field of Classification Search
USPC ....................................................... 375/134
See application file for complete search history.

(56) References Cited

U.S. PATENT DOCUMENTS

| 6,088,569 A | 7/2000 | Bach et al. ..................... 725/149 |
| 7,035,360 B2 | 4/2006 | Posti ............................ 375/350 |

(Continued)

FOREIGN PATENT DOCUMENTS

| DE | 3840999 A1 | 6/1990 | ............... H04B 1/10 |
| DE | 4220228 B4 | 10/2004 | ............... H04B 1/10 |

(Continued)

OTHER PUBLICATIONS

International Search Report and Written Opinion, Application No. PCT/EP2012/059034, 19 pages, Sep. 6, 2012.

*Primary Examiner* — Erin File
(74) *Attorney, Agent, or Firm* — King & Spalding L.L.P.

(57) ABSTRACT

A circuit arrangement for adaptively suppressing interference signals includes a first local oscillator for generating a first local oscillator signal and a second local oscillator for generating a second local oscillator signal, each signal having an adjustable frequency. The circuit arrangement also includes a first mixer for converting a high-frequency signal into a corresponding intermediate frequency signal using the first local oscillator signal and a second mixer for converting the intermediate frequency signal into a corresponding baseband signal using the second local oscillator signal. The circuit arrangement also includes a notch filter with a rigidly defined blocking range. A control unit estimates the frequency of an interference signal contained in the intermediate frequency signal and to adjust the frequency of the local oscillator signals to the estimated frequency of the interference signal such that the frequency of the interference signal is converted into the blocking range of the notch filter.

16 Claims, 3 Drawing Sheets

(56) References Cited

U.S. PATENT DOCUMENTS

| | | | |
|---|---|---|---|
| 7,706,769 B2 | 4/2010 | Perkins | 455/295 |
| 2002/0054651 A1 | 5/2002 | Posti | 375/316 |
| 2005/0123025 A1* | 6/2005 | Sorrells et al. | 375/130 |
| 2008/0125058 A1* | 5/2008 | Rofougaran | 455/74 |
| 2014/0177748 A1* | 6/2014 | Malaga et al. | 375/267 |

FOREIGN PATENT DOCUMENTS

| | | | |
|---|---|---|---|
| DE | 69834211 T2 | 12/2006 | H04B 1/10 |
| EP | 0372369 A2 | 6/1990 | B04B 1/10 |
| WO | 2012/156409 A1 | 11/2012 | H04B 1/10 |

* cited by examiner

DEVICE AND METHOD FOR ADAPTIVELY SUPPRESSING IN-BAND INTERFERENCE SIGNALS IN RADIO RECEIVERS

CROSS-REFERENCE TO RELATED APPLICATIONS

This application is a U.S. National Stage Application of International Application No. PCT/EP2012/059034 filed May 15, 2012, which designates the United States of America, and claims priority to DE Application No. 10 2011 075 893.3 filed May 16, 2011, the contents of which are hereby incorporated by reference in their entirety.

TECHNICAL FIELD

The present invention relates to the suppression of interference signals in the useful signal band in radio receivers.

BACKGROUND

Frequently, narrow-band interference signals are suppressed in radio receivers with the aid of band-stop filters. Narrow-band band-stop filters are also called notch filters. In spread-spectrum transmission methods, in particular, notch filters can be used for suppressing narrow-band interference signals (e.g. in a direct sequence spread spectrum (DSSS) receiver). Due to the frequency spreading of the useful signal, a narrow-band notch in the (spread) useful signal does not have a significant effect on the useful signal after despreading.

The frequency of an interference signal is not known a priori. Since a wide-band filtering will render the useful signal unuseable, only narrow-band filtering can be considered. For this purpose, the frequency of the interference signal can be determined and the frequency response of the notch filter can be adapted correspondingly so that the (narrow-band) stop band of the notch filter hits the interference signal. Such radio receivers plus notch filters with adaptively adaptable stop band are known, e.g., from the American patent document U.S. Pat. No. 7,706,769. However, notch filters having a stop band adaptable (in accordance with an input) are expensive to implement.

SUMMARY

One embodiment provides a circuit arrangement for suppressing interference signals with the aid of a band-stop filter; the circuit arrangement having the following features: a first local oscillator and a second local oscillator for generating a first local oscillator signal and a second local oscillator signal, respectively, with a respectively adjustable frequency; a first mixer for converting a radio-frequency signal into a corresponding intermediate-frequency signal as determined by the first local oscillator signal with adjustable frequency; a second mixer for converting the intermediate-frequency signal into a corresponding baseband signal as determined by the second local oscillator signal with adjustable frequency; a notch filter having a stop band defined by a predetermined frequency response; and a control unit which is designed for estimating the frequency of an interference signal contained in the intermediate-frequency signal and which is also designed for adapting the frequency of the local oscillator signals to the estimated frequency of the interference signal in such a manner that the frequency of the interference signal lies within the stop band of the notch filter.

In a further embodiment, the control unit has: a frequency estimator which is designed for estimating the frequency of an interference signal contained in the intermediate-frequency signal, and a local oscillator control which is designed for determining the frequency difference between the estimated frequency and the center frequency of the stop band of the notch filter and adapting the frequencies of the local oscillator signals in accordance with the frequency difference determined.

In a further embodiment, the circuit arrangement has an analog/digital converter after the first mixer in the direction of signal for digitizing the intermediate-frequency signal, and wherein at least the control unit, the second mixer and the second local oscillator are implemented digitally.

In a further embodiment, the circuit arrangement further includes an antenna and a radio-frequency receiving circuit connected to the antenna, which provides as radio-frequency signal an antenna signal received from the antenna.

In a further embodiment, the received radio-frequency signal is a wideband, modulated spread-spectrum signal and which also has a unit for despreading the baseband signal.

Another embodiment provides a method for receiving a radio-frequency signal which comprises the following: converting the radio-frequency signal from an RF band into an intermediate-frequency band by mixing the radio-frequency signal with a first local oscillator signal in order to thus obtain a corresponding intermediate-frequency signal; estimating an interference signal frequency of an interference signal contained in the intermediate-frequency signal; filtering the intermediate-frequency signal with a notch filter having a stop band; and adapting the frequencies of the local oscillator signal to the estimated frequency of the interference signal in such a manner that the frequency of the interference signal lies within the stop band of the notch filter.

In a further embodiment, the method further includes: converting the intermediate-frequency signal from the intermediate-frequency band into a baseband by means of a second local oscillator signal in order to thus obtain a corresponding baseband signal; searching for a useful signal in the baseband signal; and receiving the data contained in the useful signal when a useful signal has been found.

In a further embodiment, the method further includes repeating the preceding method steps when no useful signal has been found.

In a further embodiment, searching for a useful signal in the baseband signal comprises despreading the baseband signal by means of a known spreading sequence.

In a further embodiment, the intermediate-frequency signal is digitized before or after the filtering with the notch filter.

In a further embodiment, the notch filter is inactive during the estimating of the interference-signal frequency.

BRIEF DESCRIPTION OF THE DRAWINGS

Example embodiments of the invention are explained in greater detail below with reference to the drawings, in which.

DETAILED DESCRIPTION

Embodiments of the invention provide an arrangement and a method for adaptively suppressing in-band interference signals for the application in radio receivers, which can be implemented with the least possible (hardware and software) expenditure.

For example, a circuit arrangement for adaptively suppressing interference signals is described. The circuit arrangement has a first local oscillator for generating a first local oscillator signal and a second local oscillator for generating a second local oscillator signal having in each case an adjustable frequency. The circuit arrangement also comprises a first mixer for converting a radio-frequency signal into a corresponding intermediate-frequency signal as determined by the first local oscillator signal, and a second mixer for converting the intermediate-frequency signal into a corresponding baseband signal as determined by the second local oscillator signal. Finally, the circuit arrangement comprises a notch filter having a predetermined stop band. A control unit is designed for estimating the frequency of an interference signal contained in the intermediate-frequency signal and adapting the frequency of the local oscillator signals to the estimated frequency $f_S$ of the interference signal in such a manner that the frequency $f_S$ of the interference signal is converted into the stop band of the notch filter.

Also disclosed is a method for suppressing an interference signal in a useful signal and a radio receiver in which the abovementioned circuit arrangement is applied.

Figure 1:
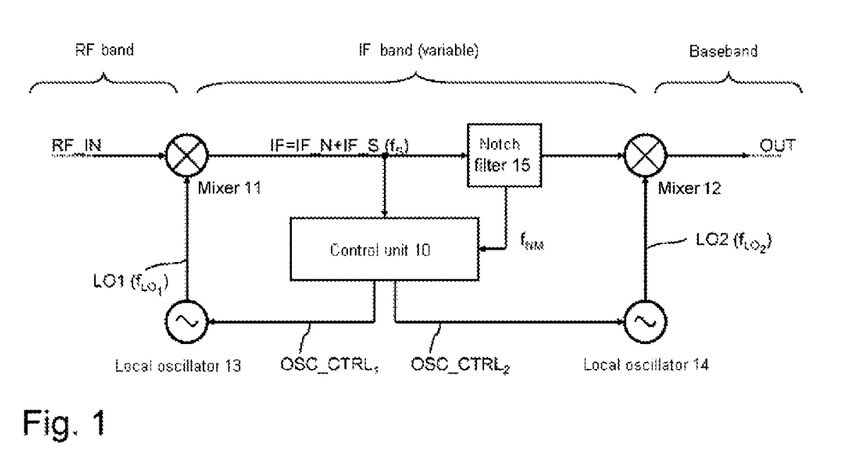
FIG. 1 shows in a block diagram a circuit arrangement for adaptively suppressing interference signals by means of a notch filter which operates in the intermediate-frequency band.

FIG. 1 shows an exemplary circuit arrangement, as shown simplified, for adaptively suppressing interference signals with the aid of a notch filter. Such a circuit arrangement can be used, for example, in a radio receiver (especially in its radio-frequency front-end unit) and, for example, in receivers of keyless access systems.

A radio-frequency input signal RF_IN (also called RF signal RF_IN in the text that follows), coming, for example, from a receiving antenna or a directional coupler, is supplied to an input of a first mixer 11. A first local oscillator 13 generates the local oscillator signal LO1, necessary for operating the mixer, with adjustable frequency $f_{LO1}$. The mixer converts the radio-frequency signal RF_IN into an intermediate-frequency signal (IF signal) IF. This intermediate-frequency signal IF is located in another, in most cases lower, frequency band (intermediate-frequency band=IF band) than the radio-frequency signal. In this context, the spectrum of the useful signal contained in the radio-frequency signal RE_IN is only displaced, if possible, but not altered, so that the information contained in the useful signal is not lost. The amount of this frequency displacement is determined by the frequency $f_{LO1}$ of the local oscillator signal LO1 which is supplied to the mixer 11, in addition to the radio-frequency signal RF_IN. As a rule, the spectral position of the intermediate-frequency signal is determined with the circuit concept. In the present example, the frequency $f_{LO1}$ of the local oscillator signal LO1 is adjustable and, in consequence, the spectral position of the IF band can be adjusted by varying the frequency $f_{LO1}$ of the corresponding local oscillator 13. The bandwidth of the intermediate-frequency signal must cover at least the spectrum of the useful signal but it can also be distinctly wider than the bandwidth of an individual useful signal in order to be able to process, for example, a number of channels in parallel in the intermediate-frequency band (e.g. digitally).

The intermediate-frequency signal IF is converted into a baseband with the aid of a second mixer 12 and a second local oscillator signal LO2, generated by a second local oscillator 14, having a frequency $f_{LO2}$, with a resultant baseband signal OUT for further processing by subsequent units. For example, when using a DSSS (Direct Sequence Spread Spectrum) transmission method, the despreading of the signal which is spread at the transmitter before the transmission takes place in the baseband.

In the intermediate-frequency band, signal preprocessing can take place, in particular, the intermediate-frequency signal IF can be filtered. In order to suppress, for example, a narrow-band interference signal IF_S, which occurs in the intermediate-frequency signal IF in addition to a useful signal IF_N (IF=IF_N+IF_S) having a center frequency $f_S$, the intermediate-frequency signal IF can be filtered with the aid of a notch filter 15. The interference signal IF_S is suppressed at the precise moment when its frequency $f_S$ is in the stop band of the notch filter 15. For this purpose, the spectral position of the stop band should be adapted to the frequency $f_S$ of the interference signal. The frequency $f_S$ of the interference signal IF_S is not known a priori or can vary. According to the example shown in FIG. 1, however, a notch filter 15 with predetermined characteristic, i.e. fixed stop-band center frequency, which is simple to implement, is used, i.e. the spectral position of the stop band is predetermined and is not variable. Instead of adapting the filter characteristic of the notch filter 15, the intermediate-frequency signal IF, thus also any interference signal IF_S contained therein, is shifted in frequency with the aid of the first mixer 11 in such a manner that the frequency $f_S$ of the interference signal IF_S contained in the intermediate-frequency signal IF comes to be located precisely within the stop band of the notch filter 15. The interference signal IF_S contained in the intermediate-frequency signal IF can thus be shifted in frequency by varying the local oscillator signal LO1 supplied to the mixer 11.

For this purpose, a control unit 10 is provided, for example, which is supplied with the intermediate-frequency signal IF and which is designed for estimating, on the basis of the intermediate-frequency signal IF, the frequency $f_S$ of the interference signal IF_S contained in the intermediate-frequency signal IF, resulting in an estimated interference signal frequency $f_S'$. If the estimated frequency $f_S'$ of the interference signal is outside the stop band of the notch filter 15, the first local oscillator signal LO1 is correspondingly adapted in order to displace the intermediate-frequency signal IF. In addition, a corresponding adaptation of the second local-oscillator signal LO2 is provided in order to keep the entire frequency displacement from the radio-frequency band (RF band) into the baseband constant. This adaptation of the local oscillator signals is carried out in the present example with the aid of the control signals OSC_CTRL$_1$ and OSC_CTRL$_2$, respectively.

Figure 2:
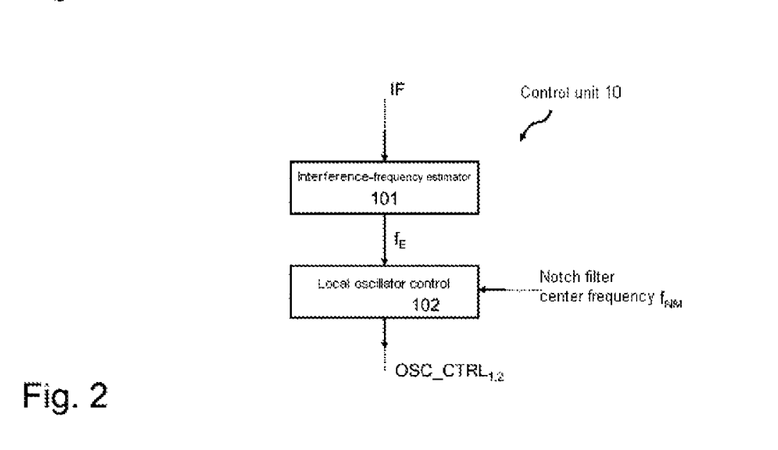
FIG. 2 shows in a block diagram a control circuit for use in the circuit arrangement according to FIG. 1.

In FIG. 2, the control unit 10 used by way of example in the arrangement according to FIG. 1 is shown in greater detail. The control unit 10 comprises at least one frequency estimator 101 and one local oscillator control 102. The frequency estimator 101 is designed for estimating the frequency $f_S$ of the possibly present interference signal IF_S from the intermediate-frequency signal IF. The frequency difference $f_E$ between the estimated interference signal frequency $f_S'$ and the center frequency $f_{NM}$ of the stop band of the notch filter 15 is the value by which the frequency of oscillation $f_{LO1}$ of the first local oscillator signal LO1 ($f_E=f_S'-f_{NM}$) would have to be corrected so that the interference signal frequency $f_S$ is located precisely in the center of the stop band of the notch filter 15 and is thus maximally attenuated. That is to say when the interference signal frequency $f_S$ is precisely (or with a certain tolerance) in the center of the stop band of the notch filter 15, the frequency difference $f_E$ is zero. Suitable methods for estimating the interference signal frequency $f_S$ or the frequency difference $f_E$ are sufficiently known.

With the aid of the frequency estimator 101, the deviation in the form of the frequency difference $f_E$ of the interference signal frequency $f_S$ from the center frequency $f_{NM}$ of the stop band of the notch filter 15 can thus be determined directly or indirectly. The local oscillator control 102 is designed for adapting the current local oscillator frequencies $f_{LO1}$ and $f_{LO2}$ of the two local oscillators 13 and 14 in accordance with the estimated frequency difference $f_E$. This means that the frequency $f_{LO1}$ of the first local oscillator signal LO1 is increased by the estimated frequency difference $f_E$ and the frequency $f_{LO2}$ of the second local oscillator signal LO2 is reduced by the estimated frequency difference $f_E$. After this adaptation, the interference signal frequency $f_S$ is located precisely in the center of the stop band of the notch filter 15 and the interference signal IF_S is suppressed in the best possible way.

Figure 3:
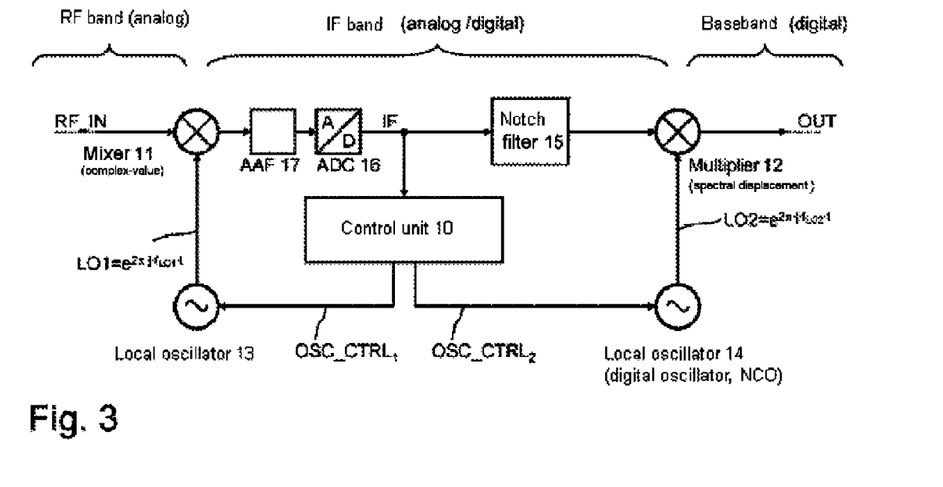
FIG. 3 shows in a block diagram the circuit arrangement from FIG. 1 but with partially digital implementation.

In this context, parts of the circuit arrangement shown in FIG. 1 can be implemented with the aid of a system for digital signal processing. An example of this is shown in FIG. 3. The arrangement shown in FIG. 3 corresponds in its basic function to that from FIG. 1, with the difference that (in the direction of signal flow) a digitization of the intermediate-frequency signal IF is performed by means of analog/digital converters 16 after the first mixer 11 and the remaining signal processing is carried out, for example, with the aid of a digital signal processor and corresponding software. Thus, at least the notch filter 15 and the control unit 10 are implemented digitally. Furthermore, the second mixer 12 is also implemented as digital multiplication (for the spectral displacement of the intermediate-frequency signal IF into the baseband) of the filtered intermediate-frequency signal IF by the second local oscillator signal LO2. The second local oscillator signal LO2 is then generated, for example, by a so-called NCO (numerically controlled oscillator), that is to say a digital oscillator.

In the illustrations of FIGS. 1 and 2, components which are not necessary for explaining the operation of the circuit arrangement have been omitted for the sake of simplicity, but can be added arbitrarily in a suitable manner such as, e.g., amplifiers, anti-aliasing filters, sampling rate converters, other filters, etc.

The notch filter 15 can also be implemented as a combination of a number of part-filters. In the example of FIG. 3, a part of the filter transfer function of the notch filter 15 could also be implemented in the form of an analog filter. In particular, the transfer function of an anti-aliasing filter connected before the analog/digital converter 16 could be selected such that this (also) operates as notch filter. Depending on the technology selected for the implementation, the notch filter can also be implemented in a completely analog manner. With a purely digital implementation, filter transfer functions used in any case, for example, in the digital signal processing path of a receiver can be modified in such a manner that the desired notch filter transfer function is implemented. A filter present in any case for correcting errors in magnitude and phase between the in-phase and quadrature signal components could be used, e.g., for this purpose. In the simplest case, the notch filter is a simple high-pass filter (for the case that the interference signal is mixed to zero frequency), which can also be called a DC notch filter. Optionally, the notch filter can be deactivated during the frequency estimation in order to avoid interference signals from being covered during the estimation.

Various methods are known for the actual frequency estimation. A minimum variance estimator which is true to the expectation for the interference signal frequency is, for example, $$f'_s = \frac{f_s}{2\pi} \sum_{k=1}^{L_0-1} \gamma(k) \arg\{z(k)z^*(k)\}, \quad (1)$$

where the smoothing function $\gamma(k)$ is calculated as follows:

$$\gamma(k) = \frac{3}{2} \frac{L_0}{L_0^2 - 1}\left[1 - \left(\frac{2k - L_0}{L_0}\right)^2\right]. \quad (2)$$

The variable $f_S$ here designates the sampling frequency, $z(k)$ the sample at sampling time k, $z^*(k)$ the conjugate complex sample at sampling time k−1, and the parameter $L_0$ designates the number of samples which are processed for an estimation (compare U. Mengali, A. N. D'Andrea: Carrier Frequency Recovery with Linear Modulations (Chapter 3), In: Synchronization Techniques for Digital Receivers, Plenum Press, New York, 1997).

Figure 4:
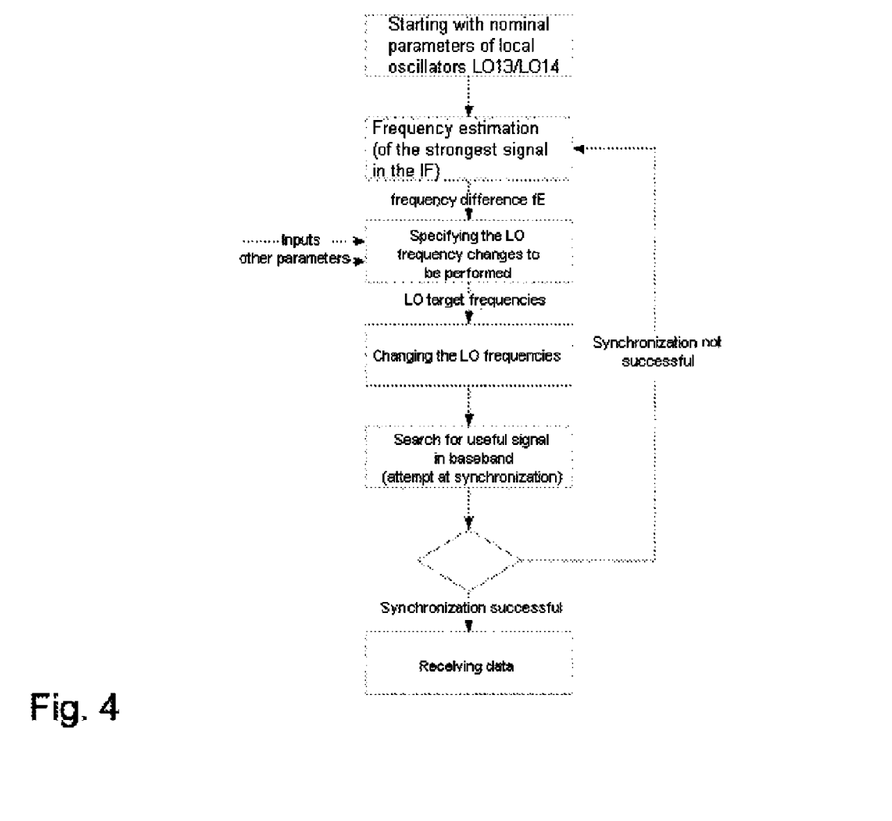
FIG. 4 shows in a flowchart a method for receiving radio signals in which narrow-band interference signals are adaptively suppressed.

FIG. 4 shows a flowchart of a method for receiving radio signals in which narrow-band interference signals are adaptively suppressed with the aid of the circuit arrangements from FIG. 1 or 3.

Firstly, the frequency $f_S$ of the interference signal IF_S is estimated, the local oscillator signals LO1 and LO2, and thus the position of the intermediate-frequency band, having nominal (i.e. predetermined standard) values. From the estimated interference signal frequency $f_S$, the frequency difference $f_E$ can be determined, with the consequence that the interference signal contained in the intermediate-frequency signal IF is not within the stop band of the notch filter. Following this, the local oscillator frequencies $f_{LO1}$ and $f_{LO2}$ are adapted by the frequency difference $f_E$ determined so that the intermediate-frequency band shifts by the frequency value $f_E$ and the interference signal IF_S comes to lie precisely within the stop band of the notch filter 15.

Following this, the baseband can be searched for the useful signal (i.e. for coded information). If this search is successful, the data contained in the useful signal can be received. If not, it is attempted again to estimate the interference signal frequency $f_S$ and the method described begins anew until proper data reception is possible.

The decision whether an adaptation of the local oscillator frequencies $f_{LO1}$, $f_{LO2}$ is actually performed can also be made dependent on other (e.g. externally determined) parameters. For example, "forbidden" frequency bands can be predetermined for the local oscillator control in which this should not be impaired at all by notch filtering. Furthermore, a minimum level (received signal strength indicator level, RSSI level) can be predetermined which the interference signal must have in order to be recognized as such.

Figure 5:
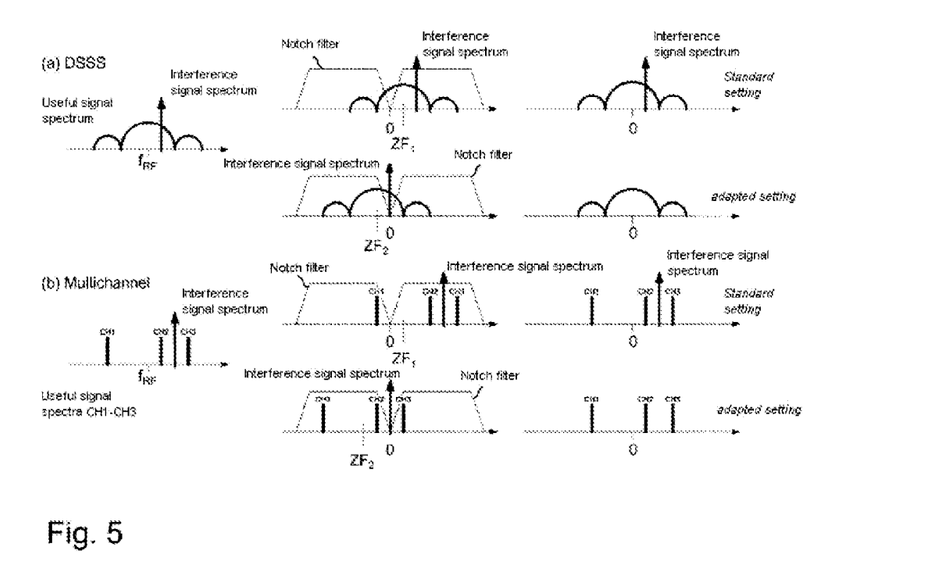
FIG. 5 shows an example effect of one embodiment using diagrams that represent the spectra of useful signal and interference signal in the radio-frequency band, in the intermediate-frequency band and in the baseband.

FIG. 5 diagrammatically shows an example effect of one embodiment using a DSSS signal (FIG. 5*a*) as useful signal and for the case of a number of (narrow-band) useful signals of different channels (FIG. 5*b*). In both cases, the spectrum of the useful signal (or of the useful signals of several channels) can be seen on the left in the radio-frequency band, the corresponding spectrum can be seen in the center in the intermediate-frequency band and the resulting spectrum can be seen on the right in the baseband. In both figures (FIGS. 5a and 5b) two variants are shown, the first variant (intermediate-frequency signal $IF_1$) in each case showing the local-oscillator setting to nominal values, and the second variant (intermediate-frequency signal $IF_1$) showing the adapted state in which the interference signal spectrum is located in the stop band of the notch filter.

In the standard setting, the interference signal cannot be eliminated by the notch filter since the interference signal spectrum can virtually lie anywhere within the intermediate signal and does not have to lie within the stop band of the notch filter. According to the described example embodiments, the intermediate-frequency signal is displaced spectrally by adaptation of the local oscillator frequencies in such a manner that the spectrum of the interference signal comes to lie precisely within the stop band of the notch filter. In the present example, the notch filter is a so-called DC notch filter, i.e. the center frequency is zero.

In the text which follows, some aspects of embodiments of the invention are summarized again without claiming completeness. One example embodiment provides a circuit arrangement for suppressing interference signals with the aid of a band-stop filter. The circuit arrangement can have the following components: a first local oscillator 13 and a second local oscillator 14 for generating a first local oscillator signal LO1 and a second local oscillator signal LO2, respectively, with a respectively adjustable frequency $f_{LO1}$ and $f_{LO2}$, respectively; a first mixer 11 for converting a radio-frequency signal RF_IN into a corresponding intermediate-frequency signal IF as determined by the first local oscillator signal LO1; a second mixer 12 for converting the intermediate-frequency signal IF into a corresponding baseband signal OUT as determined by the second local oscillator signal LO1; a notch filter 15 having a stop band defined by a predetermined frequency response; and a control unit 10 which is designed for estimating the frequency $f_S$ of an interference signal IF_S contained in the intermediate-frequency signal IF and which is also designed for adapting the frequency $f_{LO1}$, $f_{LO2}$ of the local oscillator signals LO1, LO2 to the estimated frequency $f_S$ of the interference signal IF_S in such a manner that the frequency $f_S$ of the interference signal lies within the stop band of the notch filter 15. Such a circuit arrangement allows a notch filter having a fixed frequency response to be used. No filters adaptable in their frequency response are needed in the intermediate-frequency band.

The control unit 10 can have a frequency estimator 101 which is designed for estimating the frequency $f_S$ of an interference signal contained in the intermediate-frequency signal IF. It can also have a local oscillator control 102 which is designed for minimizing the frequency difference $f_E$ between the estimated frequency $f_S'$ of the interference signal and the center frequency $f_{NM}$ of the stop band of the notch filter 15 (the difference would then be zero in the ideal case). For this purpose, the local oscillator control 102 adapts the frequencies of the local oscillator signals LO1, LO2 in accordance with the frequency difference $f_E$ determined. The spectral position of the intermediate-frequency band is in consequence variable and can be selected in such a manner that the interference signal IF_S always lies within the (predetermined) stop band of the notch filter 15.

The circuit arrangement can be implemented partially digitally. For the digitization of the intermediate-frequency signal IF, an analog/digital converter 16 can be provided after the first mixer 11 in the direction of signal flow. For example, at least the control unit 10, the second mixer 12 and the second local oscillator 14 are then implemented digitally. This reduces the needed hardware expenditure further.

The circuit arrangement can be used in a radio receiver. This can have an antenna and a radio-frequency receiving circuit connected to the antenna, which circuit provides the antenna signal received from the antenna as radio-frequency signal RF_IN for the circuit arrangement. Especially in the case of spread-spectrum receivers, a suppression of narrow-band interference signals in the intermediate-frequency band is appropriate for improving the signal/noise ratio in the baseband signal. In this case, the received radio-frequency signal RF_IN can be a wideband, modulated spread-spectrum signal. In this case, the radio receiver can have a unit for despreading the baseband signal OUT. Band-spreading transmission methods can be applied, for example, in keyless access systems, especially in the motor vehicle field.

A further example embodiment provides a method for receiving a radio-frequency signal. The method comprises the following: Converting the radio-frequency signal RF_IN from a radio-frequency band into an intermediate-frequency band by mixing the radio-frequency signal with a first local oscillator signal LO1 in order to thus obtain a corresponding intermediate-frequency signal IF; estimating an interference signal frequency $f_S$ of an interference signal IF_S contained in the intermediate-frequency signal IF; filtering the intermediate-frequency signal IF with a notch filter 15 having a predeterminable stop band; and adapting the frequencies of the local oscillator signal LO1 to the estimated frequency $f_S$ of the interference signal in such a manner that the frequency $f_S$ of the interference signal lies within the stop band of the notch filter. The filter characteristic of the notch filter 15 can be predetermined in this method and does not need to be adaptively adapted to the interference signal. The frequency estimation can be performed, especially in the intermediate-frequency band. However, a frequency estimation in the baseband or in the radio-frequency band is also possible. Filtering itself, however, is carried out in the intermediate-frequency band.

The method can also comprise the converting of the intermediate-frequency signal IF from the intermediate-frequency band into a baseband by means of a second local oscillator signal LO2 in order to thus obtain a corresponding base band signal OUT. In the baseband, it is then possible to search for a useful signal and the data contained in the useful signal can be received if a useful signal has been found. If no useful signal is found, the above method steps can be repeated until a useful signal is detected. In the case of a spread-spectrum transmission, the searching for the useful signal comprises despreading the baseband signal by means of a known spreading sequence. A partially digital implementation of the method is possible. For example, the intermediate-frequency signal IF can be digitized before or after the filtering with the notch filter 15.

All arrangements shown can be implemented as pure hardware or pure software applications or as a mixture of the two. The hardware can be designed to be analog, digital or mixed analog/digital, as required.

LIST OF REFERENCE SYMBOLS

10 Control unit
101 Interference-frequency estimator
102 Local oscillator control
11 Mixer
12 Mixer (multiplier)
13 Local oscillator
14 Local oscillator 15 Notch filter
16 Analog/digital converter
17 Anti-aliasing filter
RF_IN Radio-frequency input signal
IF Intermediate-frequency signal
IF_N Useful signal in the intermediate-frequency band
IF_S Interference signal in the intermediate-frequency band
OUT Baseband signal
$f_{LO1}$, $f_{LO2}$ Frequencies of the local oscillators 13 and 14, respectively
$f_S$ Interference signal frequency
$f_E$ Frequency difference
$f_{NM}$ Notch filter center frequency
LO1 Local oscillator signal with frequency $f_{LO1}$
LO2 Local oscillator signal with frequency $f_{LO2}$
$OSC\_CTRL_1$ Control signal for local oscillator 13
$OSC\_CTRL_2$ Control signal for local oscillator 14

What is claimed is:

1. A circuit arrangement for suppressing interference signals with the aid of a band-stop filter, the circuit arrangement comprising:
a first local oscillator for generating a first local oscillator signal with an adjustable frequency and a second local oscillator for generating a second local oscillator signal with an adjustable frequency;
a first mixer for converting a radio-frequency signal into a corresponding intermediate-frequency signal using the first local oscillator signal with adjustable frequency;
a second mixer for converting the intermediate-frequency signal into a corresponding baseband signal using the second local oscillator signal with adjustable frequency;
a notch filter having a stop band defined by a predetermined frequency response; and
a control unit configured to:
estimate the frequency of an interference signal contained in the intermediate-frequency signal; and
control the first local oscillator to shift, over time, the frequency of the local oscillator signals generated by the first local oscillator and fed to the first mixer to match the estimated frequency of the interference signal such that the frequency of the interference signal lies within the stop band of the notch filter.

2. The circuit arrangement of claim 1, wherein the control unit comprises:
a frequency estimator configured to estimate the frequency of an interference signal contained in the intermediate-frequency signal, and
a local oscillator control configured to determine the frequency difference between the estimated frequency and the center frequency of the stop band of the notch filter and adapt the frequencies of the local oscillator signals based on the determined frequency difference.

3. The circuit arrangement of claim 1, further comprising an analog/digital converter downstream of the first mixer and configured to digitize the intermediate-frequency signal,
wherein at least the control unit, the second mixer, and the second local oscillator are implemented digitally.

4. The circuit arrangement of claim 1, further comprising an antenna and a radio-frequency receiving circuit connected to the antenna and configured to provide as radio-frequency signal an antenna signal received from the antenna.

5. The circuit arrangement of claim 1, wherein the received radio-frequency signal is a wideband, modulated spread-spectrum signal and wherein the circuit arrangement comprises a unit for despreading the baseband signal.

6. A method for receiving a radio-frequency signal, comprising:
converting the radio-frequency signal from an RF band into an intermediate-frequency band by mixing the radiofrequency signal with a first local oscillator signal at a mixer to obtain a corresponding intermediate-frequency signal;
estimating an interference signal frequency of an interference signal contained in the intermediate-frequency signal;
filtering the intermediate-frequency signal with a notch filter having a stop band; and
shifting the frequencies of the local oscillator signal input to the mixer over time until it is determined that the frequency of the local oscillator signal matches the estimated frequency of the interference signal such that the frequency of the interference signal lies within the stop band of the notch filter.

7. The method of claim 6, further comprising:
converting the intermediate-frequency signal from the intermediate-frequency band into a baseband using a second local oscillator signal to obtain a corresponding baseband signal;
searching for a useful signal in the baseband signal; and
receiving the data contained in the useful signal when a useful signal has been found.

8. The method of claim 7, further comprising repeating the converting, searching, and receiving steps when no useful signal is found.

9. The method of claim 7, in which the searching for a useful signal in the baseband signal comprises;
despreading the baseband signal by means of a known spreading sequence.

10. The method of claim 6, wherein the intermediate-frequency signal is digitized before or after the filtering with the notch filter.

11. The method of claim 6, wherein the notch filter is inactive during the estimating of the interference-signal frequency.

12. A keyless access system, comprising:
a radio receiver comprising a circuit arrangement for suppressing interference signals with the aid of a band-stop filter, the circuit arrangement comprising:
a first local oscillator for generating a first local oscillator signal with an adjustable frequency and a second local oscillator for generating a second local oscillator signal with an adjustable frequency;
a first mixer for converting a radio-frequency signal into a corresponding intermediate-frequency signal using the first local oscillator signal with adjustable frequency;
a second mixer for converting the intermediate-frequency signal into a corresponding baseband signal using the second local oscillator signal with adjustable frequency;
a notch filter having a stop band defined by a predetermined frequency response; and
a control unit configured to:
estimate the frequency of an interference signal contained in the intermediate-frequency signal; and
control the first local oscillator to shift over time, the frequency of the local oscillator signals generated by the first local oscillator and fed to the first mixer to match the estimated frequency of the interference signal such that the frequency of the interference signal lies within the stop band of the notch filter.

13. The keyless access system of claim 12, wherein the control unit comprises:

a frequency estimator configured to estimate the frequency of an interference signal contained in the intermediate-frequency signal, and a local oscillator control configured to determine the frequency difference between the estimated frequency and the center frequency of the stop band of the notch filter and adapt the frequencies of the local oscillator signals based on the determined frequency difference.

14. The keyless access system of claim 12, wherein the circuit arrangement of the radio receiver further comprises an analog/digital converter downstream of the first mixer and configured to digitize the intermediate-frequency signal, wherein at least the control unit, the second mixer, and the second local oscillator are implemented digitally.

15. The keyless access system of claim 12, wherein the circuit arrangement of the radio receiver further comprises an antenna and a radio-frequency receiving circuit connected to the antenna and configured to provide as radio-frequency signal an antenna signal received from the antenna.

16. The keyless access system of claim 12, wherein the received radio-frequency signal is a wideband, modulated spread-spectrum signal and wherein the circuit arrangement comprises a unit for despreading the baseband signal.

* * * * *